United States Patent
Sundaram et al.

(10) Patent No.: US 6,934,774 B1
(45) Date of Patent: Aug. 23, 2005

(54) METHOD AND SYSTEM FOR RELIABLE DEVICE CONFIGURATION IN A COMPUTER SYSTEM

(75) Inventors: Rajesh Sundaram, Sunnyvale, CA (US); Toshiya Miyazaki, San Jose, CA (US); Isamu Yamada, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/467,569

(22) Filed: Dec. 20, 1999

(51) Int. Cl.[7] .............................. G06F 3/00; G06F 9/00; G06F 17/00
(52) U.S. Cl. .............................. 710/19; 710/8; 710/15; 710/16; 710/17; 710/18; 710/20; 715/705; 715/708
(58) Field of Search .............................. 710/1–74, 315, 710/302; 345/772; 709/310, 227; 370/402; 700/17

(56) References Cited

U.S. PATENT DOCUMENTS

| | | | | |
|---|---|---|---|---|
| 5,386,360 A | * | 1/1995 | Wilson et al. | 700/17 |
| 5,548,782 A | * | 8/1996 | Michael et al. | 703/24 |
| 5,787,019 A | * | 7/1998 | Knight et al. | 709/324 |
| 5,953,010 A | * | 9/1999 | Kampe et al. | 345/772 |
| 5,958,020 A | * | 9/1999 | Evoy et al. | 710/3 |
| 6,286,066 B1 | * | 9/2001 | Hayes et al. | 710/302 |
| 6,389,029 B1 | * | 5/2002 | McAlear | 370/402 |
| 6,389,560 B1 | * | 5/2002 | Chew | 710/315 |
| 6,466,981 B1 | * | 10/2002 | Levy | 709/227 |
| 6,473,811 B1 | * | 10/2002 | Onsen | 710/15 |

* cited by examiner

Primary Examiner—Jeffrey Gaffin
Assistant Examiner—Joshua D Schneider
(74) Attorney, Agent, or Firm—Sheppard Mullin Richter & Hampton LLP

(57) ABSTRACT

A configuration notification unit monitors internal messages generated by an operating system of a computer related to a device configuration process for plug and play devices coupled to the computer via a serial bus interface. The configuration notification unit outputs a real time warning to the user when it is unsafe to change the number of devices coupled to the computer. In a preferred embodiment, the configuration notification unit include a message handler coupled to an indication unit.

27 Claims, 13 Drawing Sheets

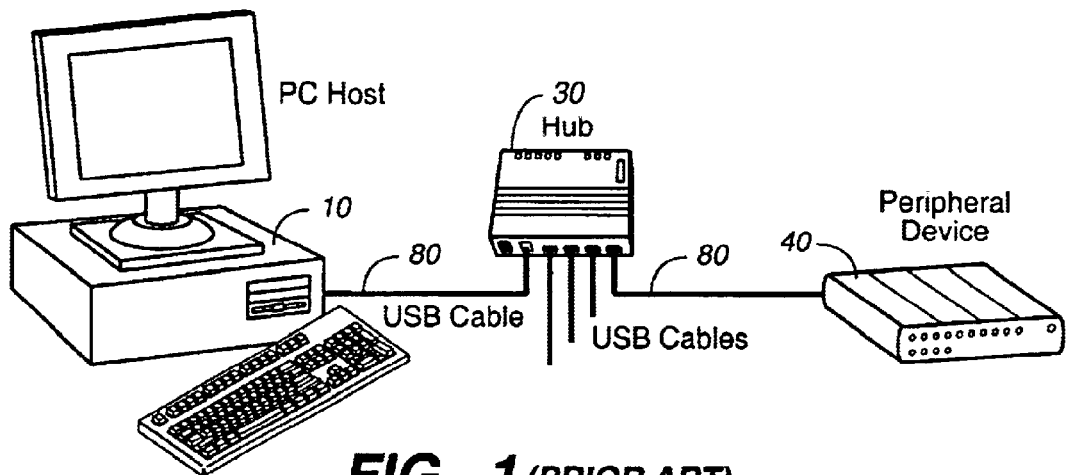
*FIG._1* *(PRIOR ART)*
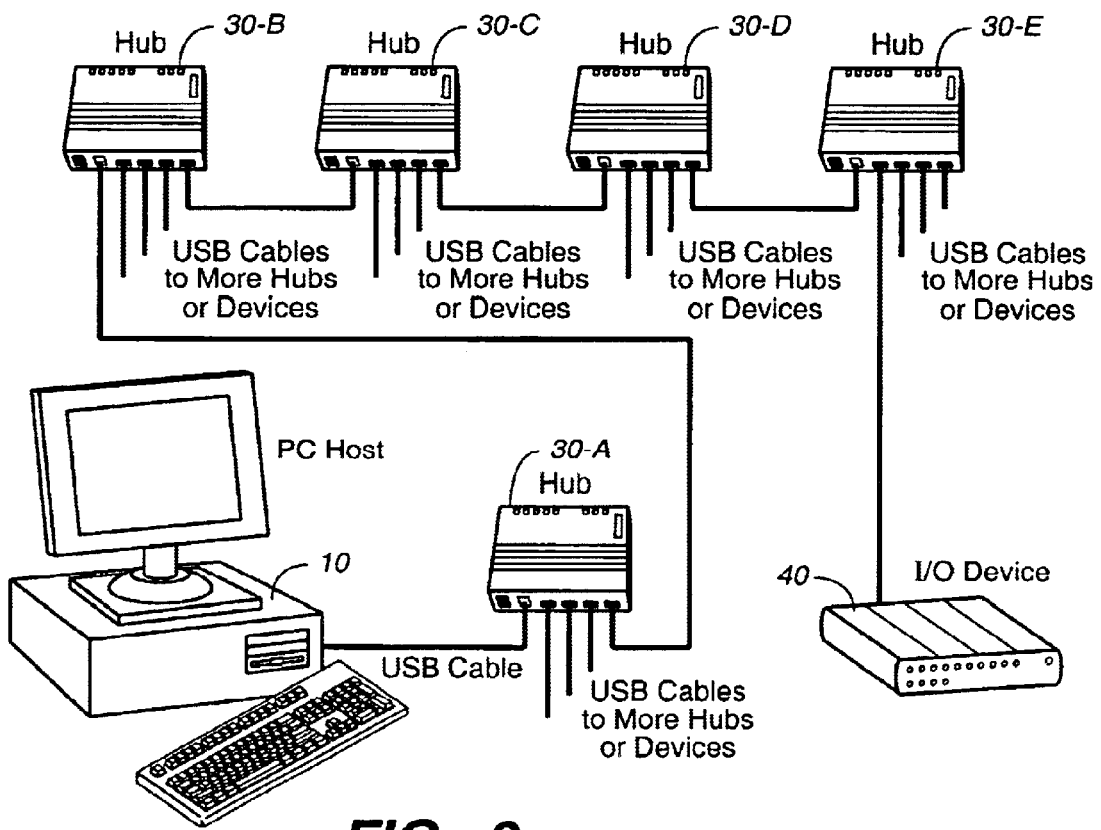
*FIG._2* *(PRIOR ART)*

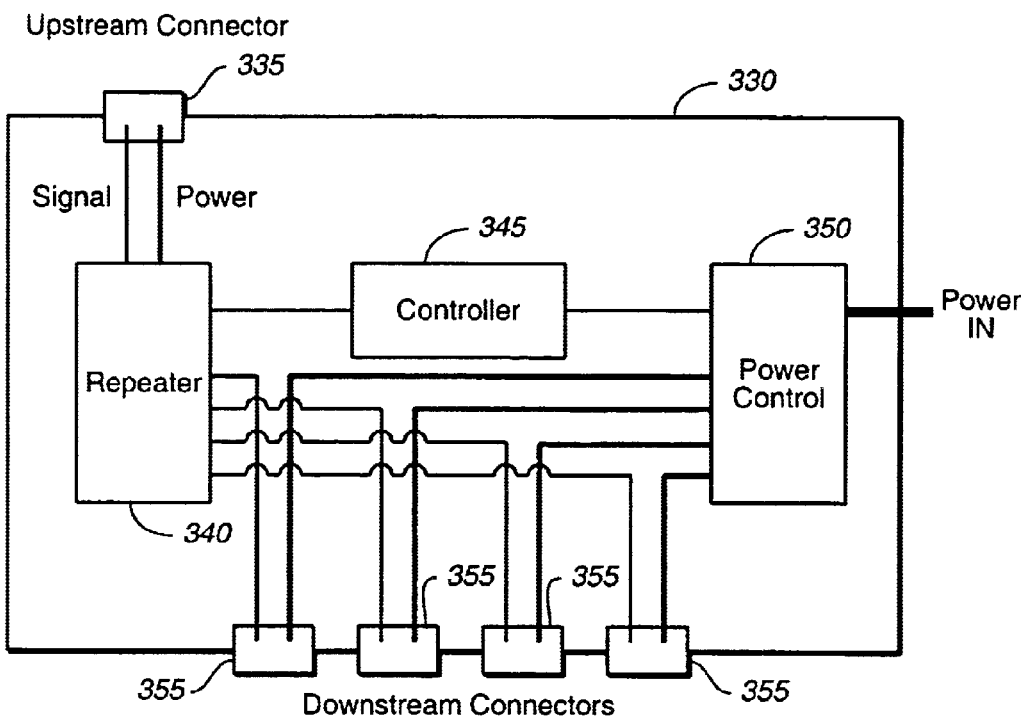
FIG._3 *(PRIOR ART)*
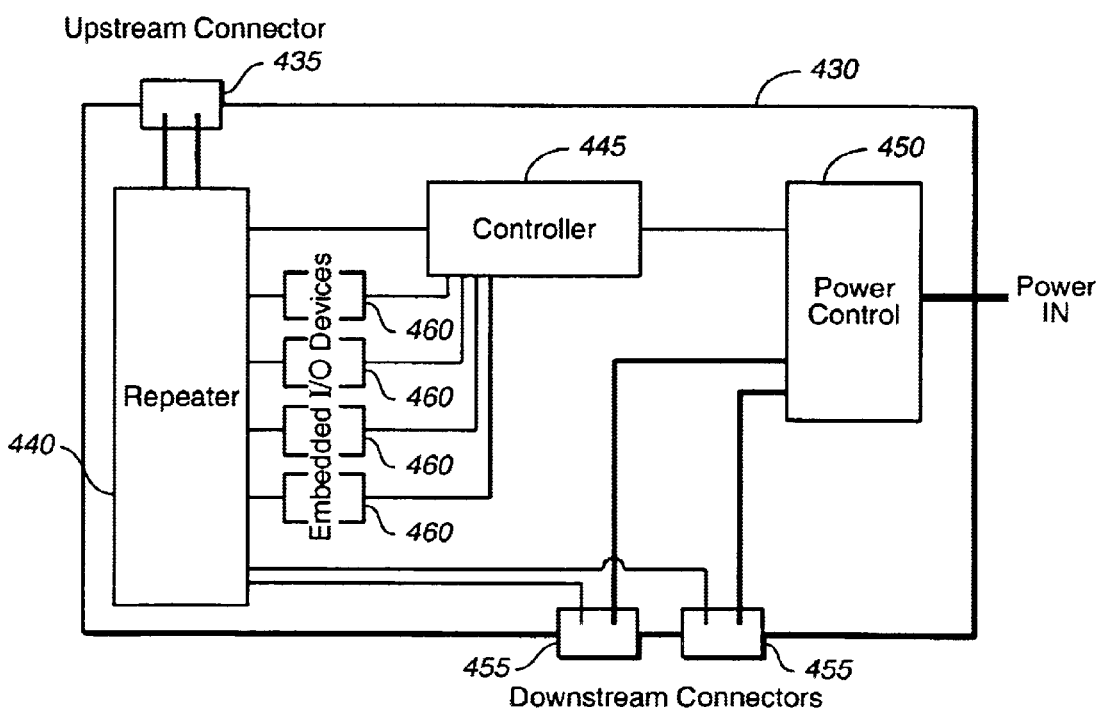
FIG._4 *(PRIOR ART)*

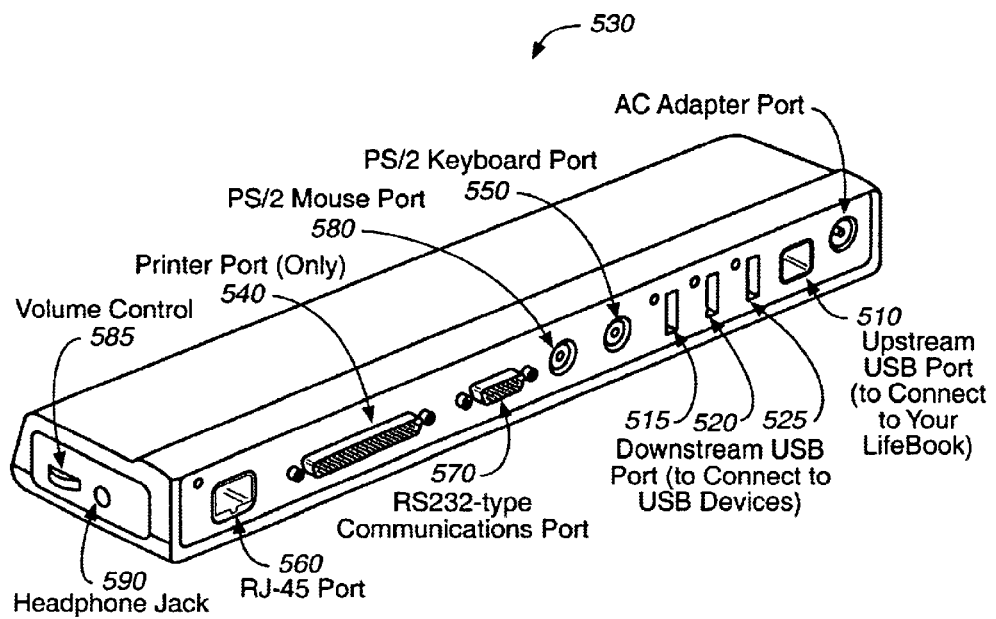
FIG._5A (PRIOR ART)

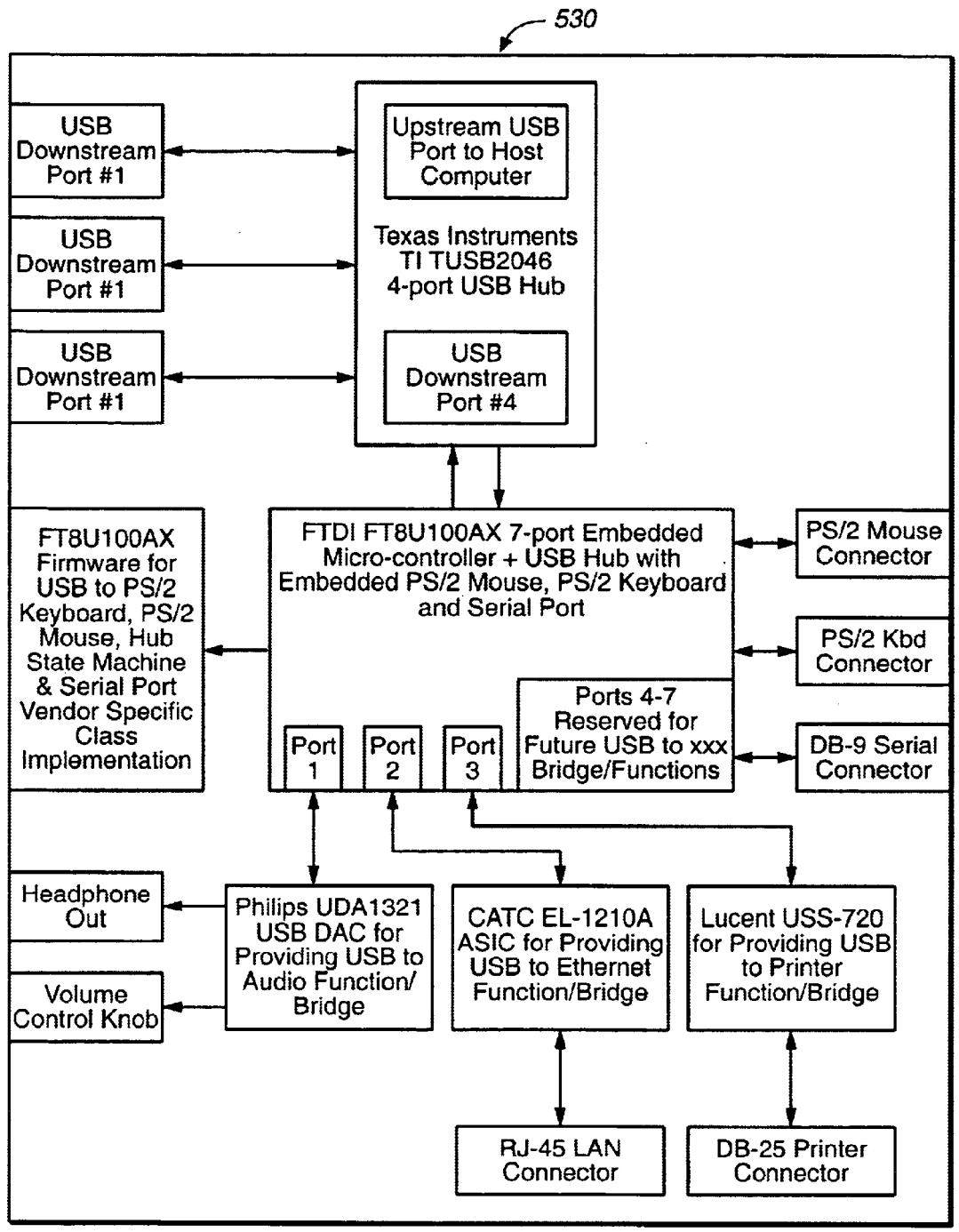
*FIG._5B (PRIOR ART)*

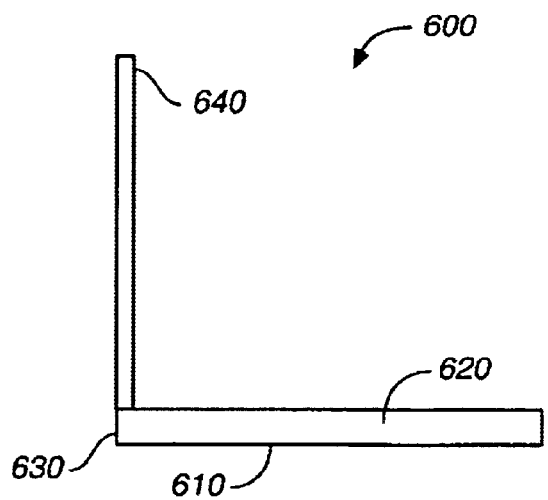
FIG._6A *(PRIOR ART)*
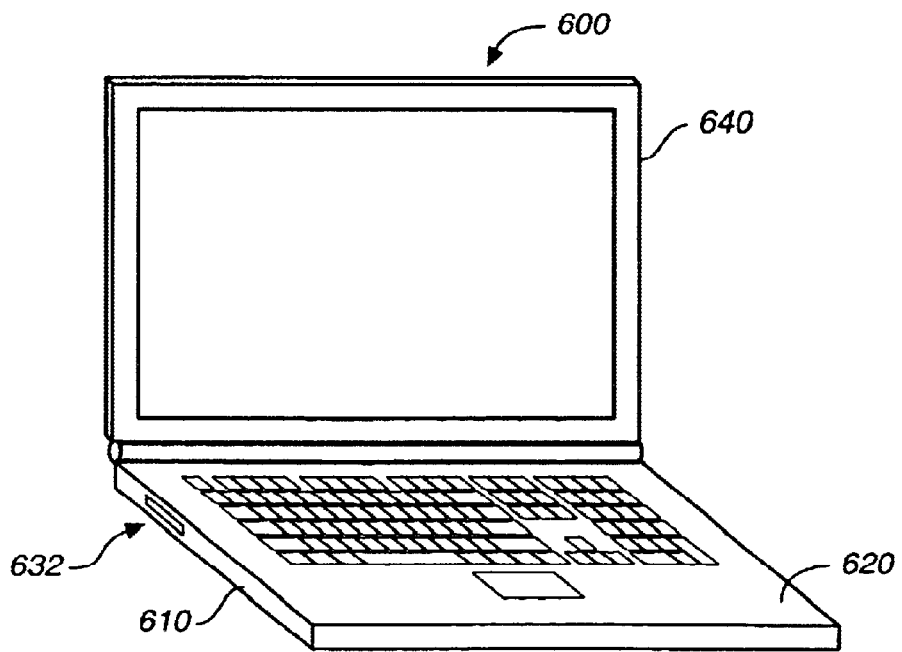
FIG._6B *(PRIOR ART)*

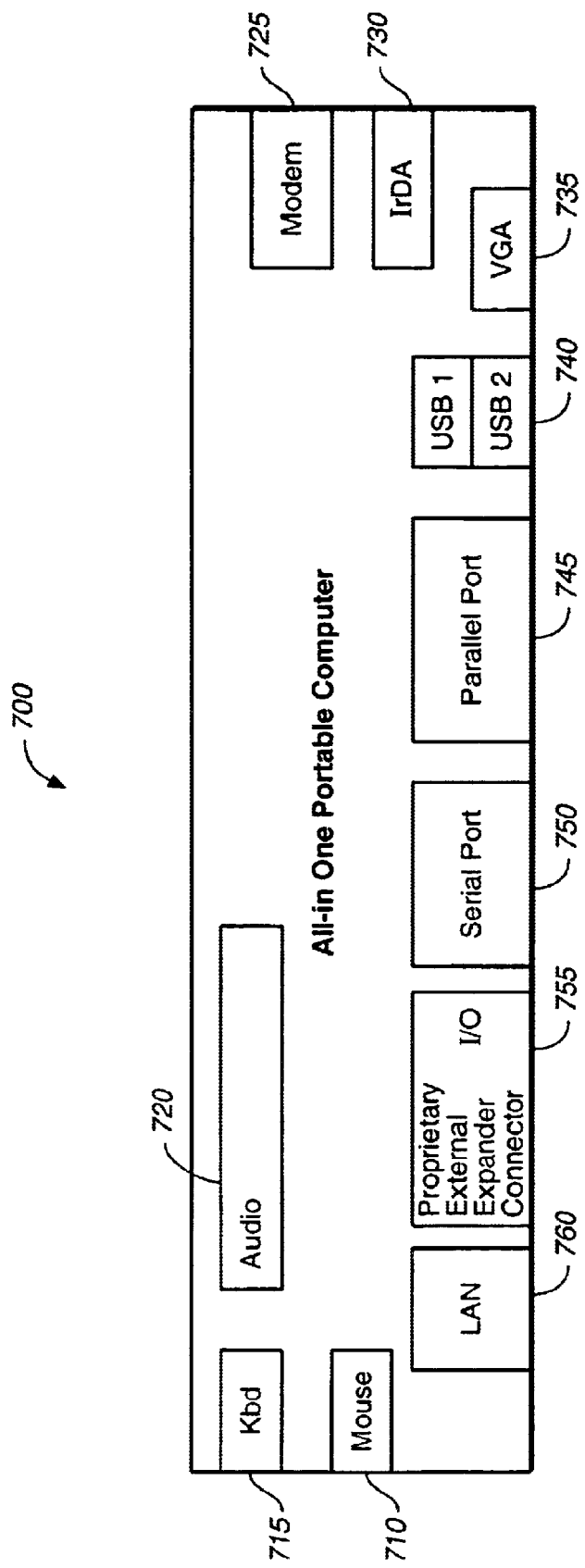
FIG._7 (PRIOR ART)

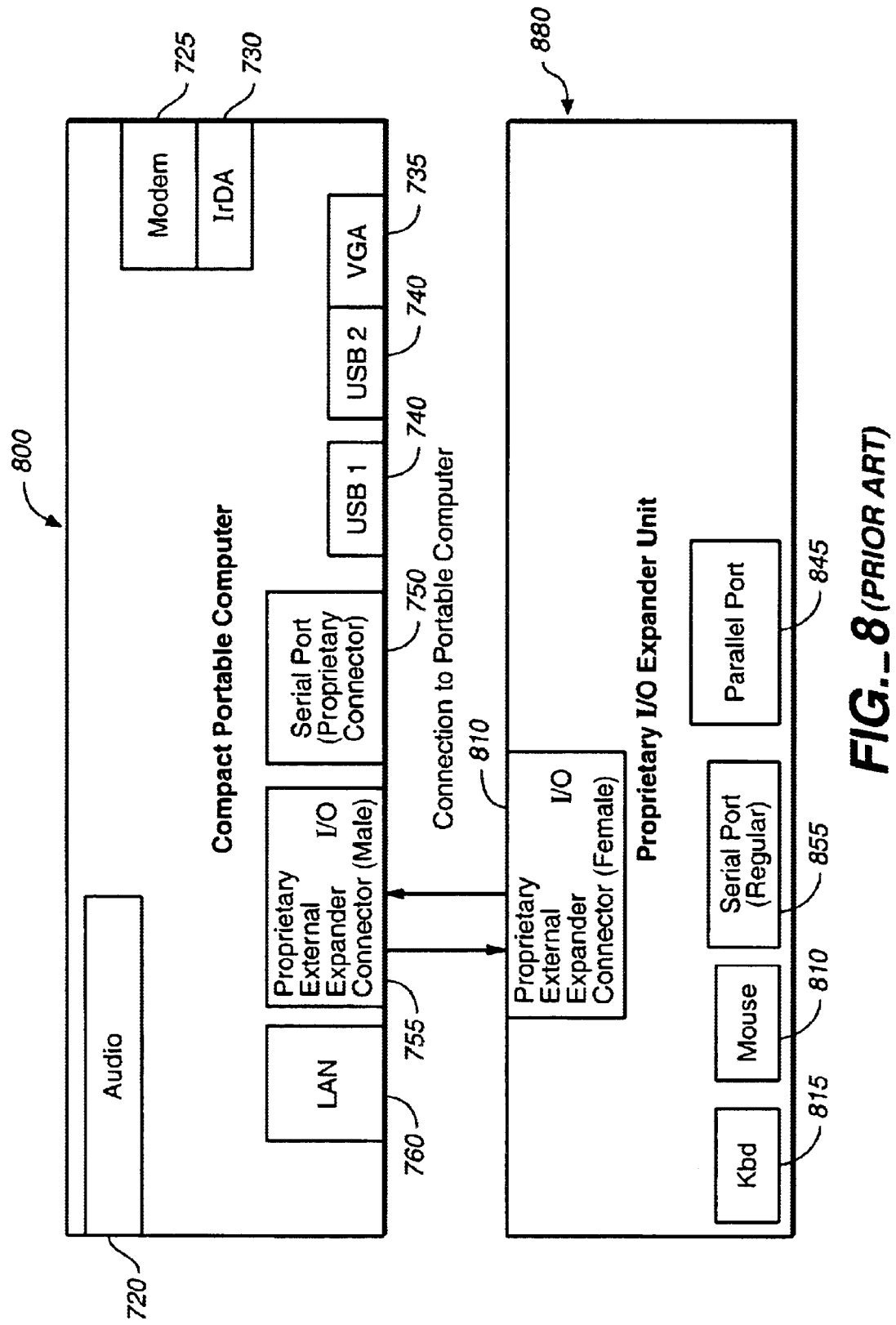
FIG._8 (PRIOR ART)

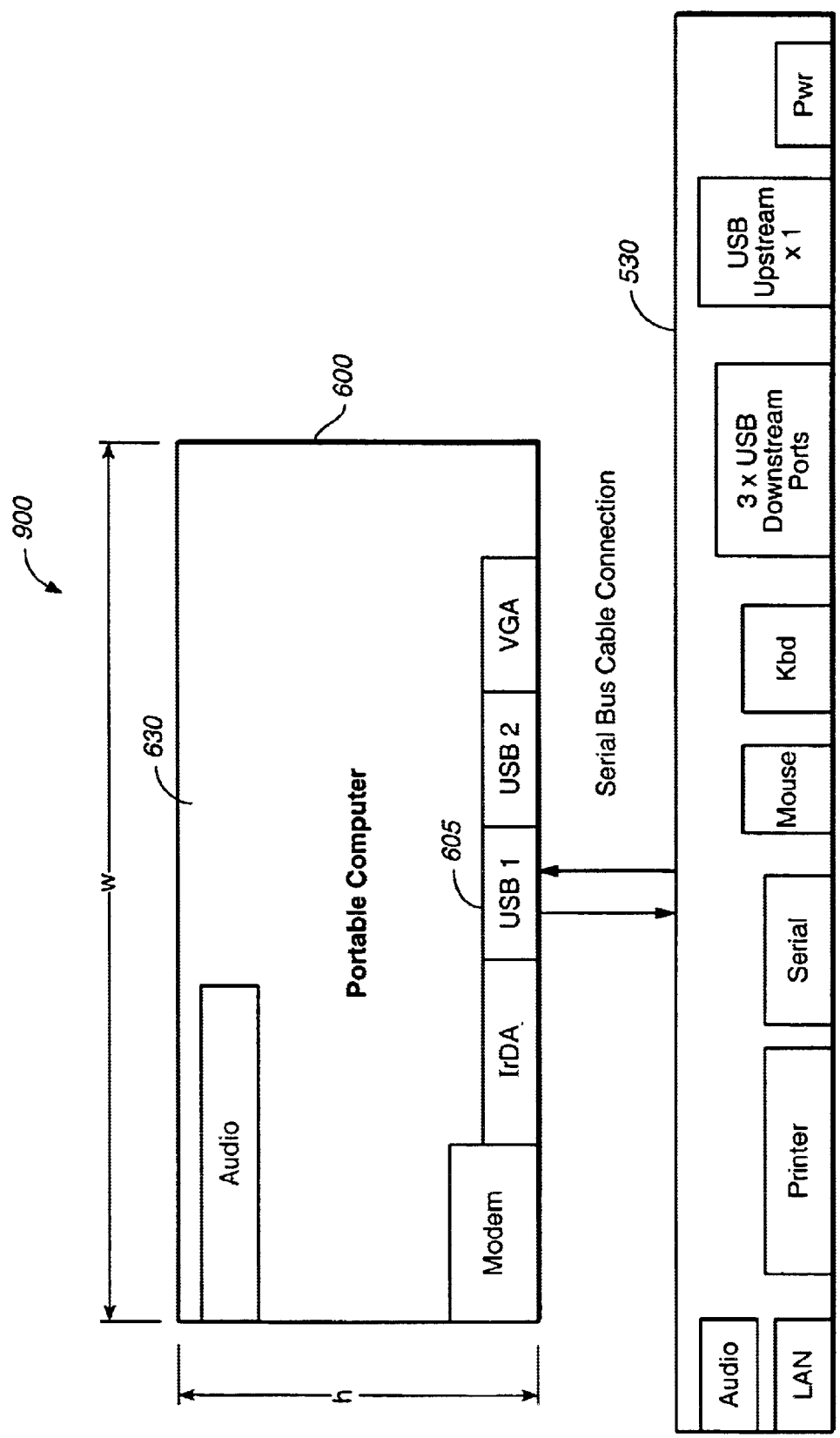
FIG._9

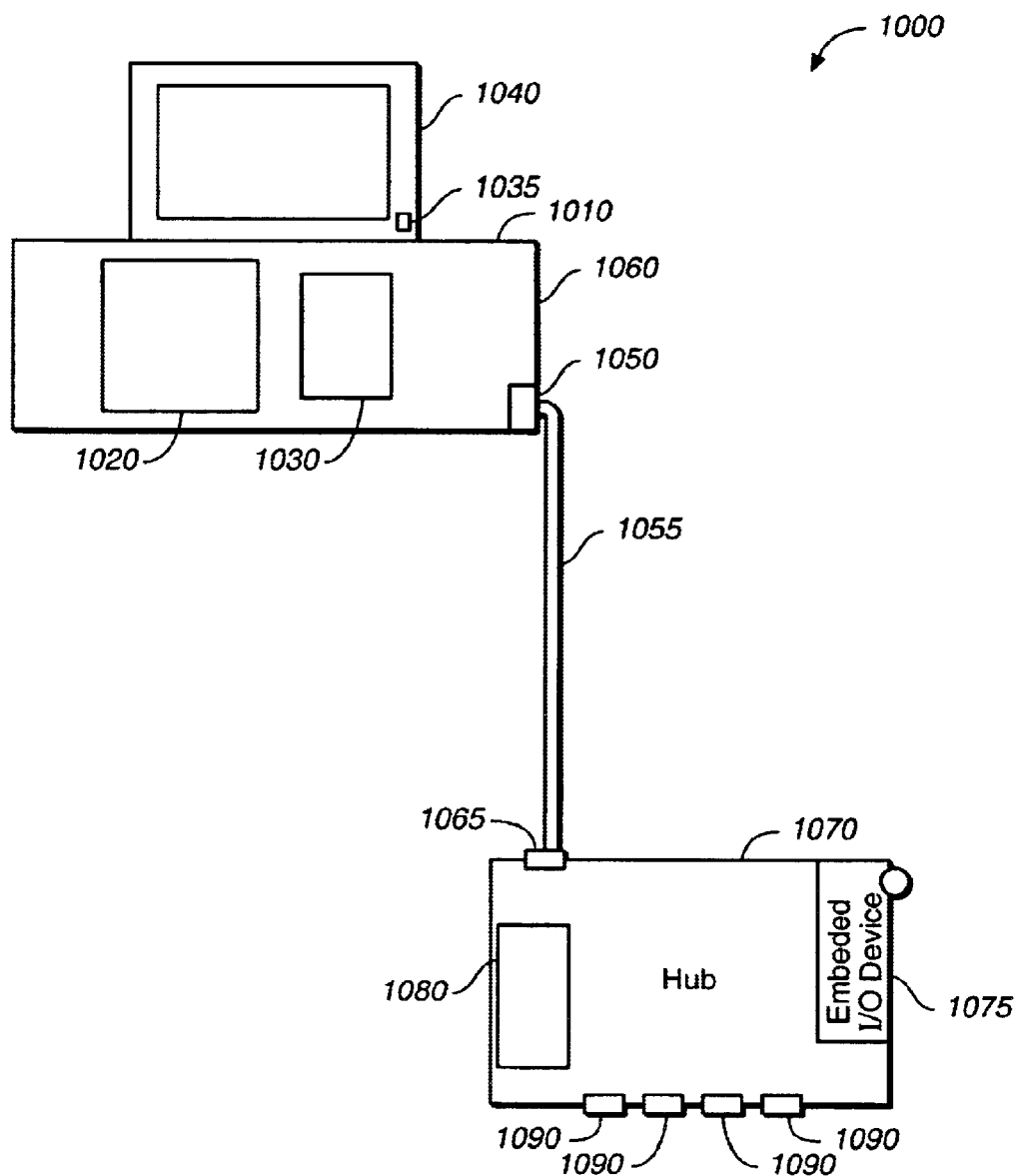
FIG._10

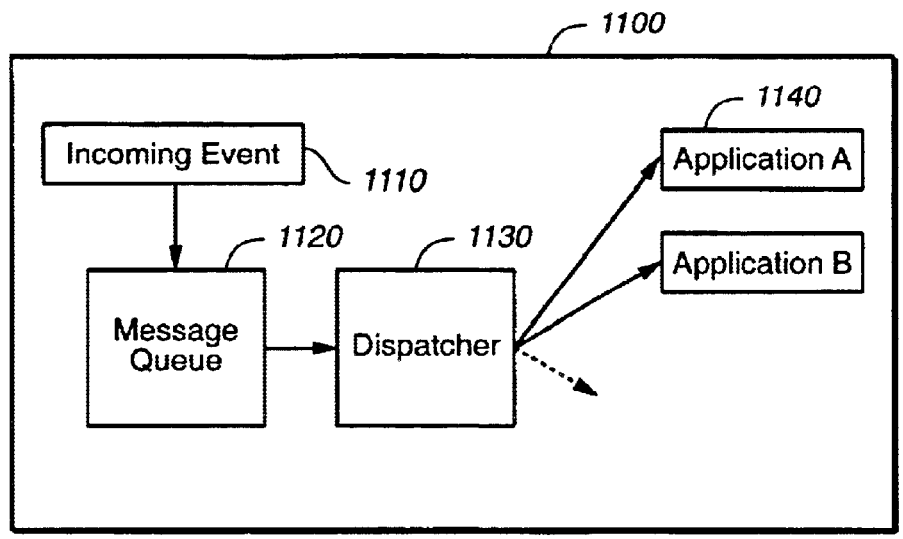
FIG._11A (PRIOR ART)
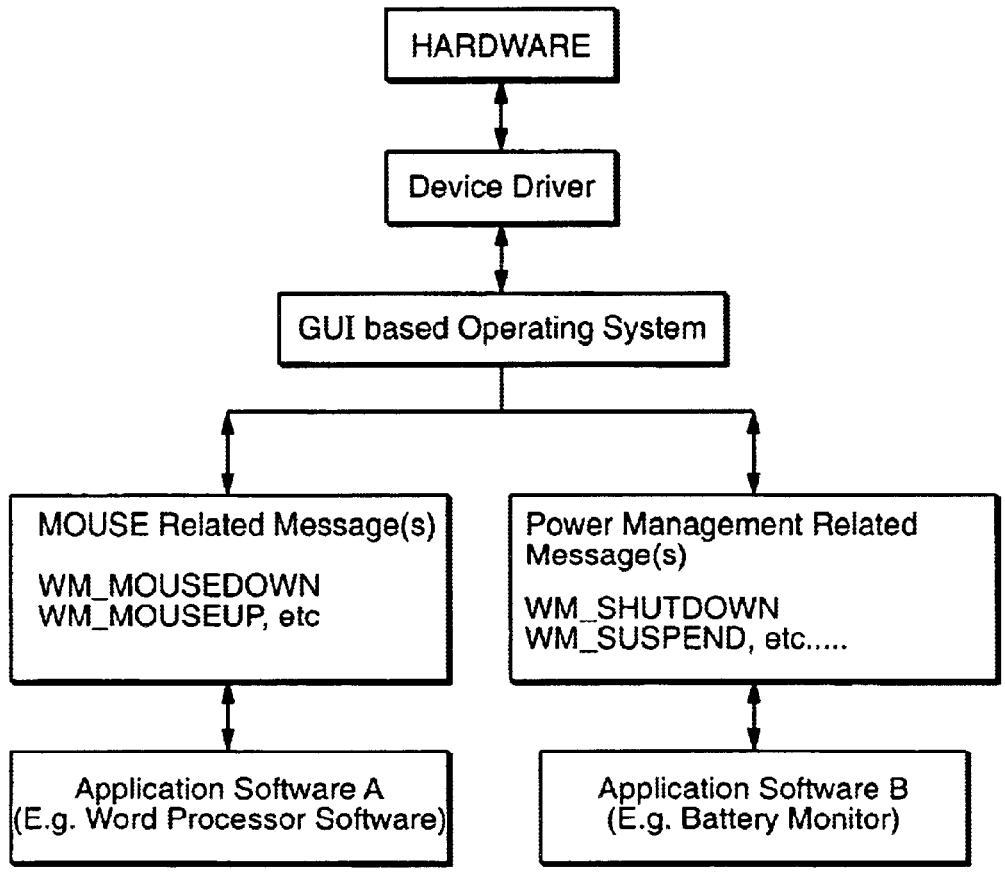
FIG._11B (PRIOR ART)

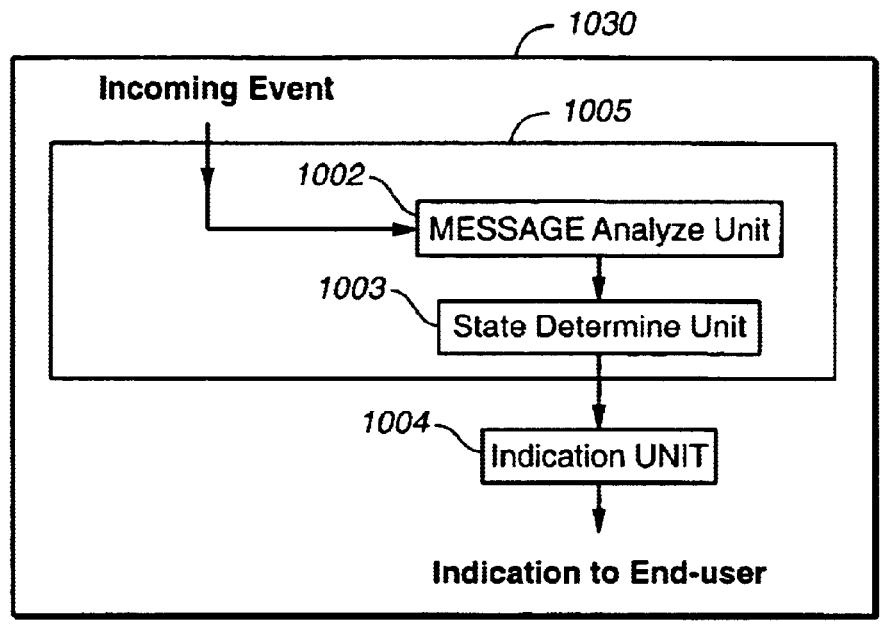
FIG._12
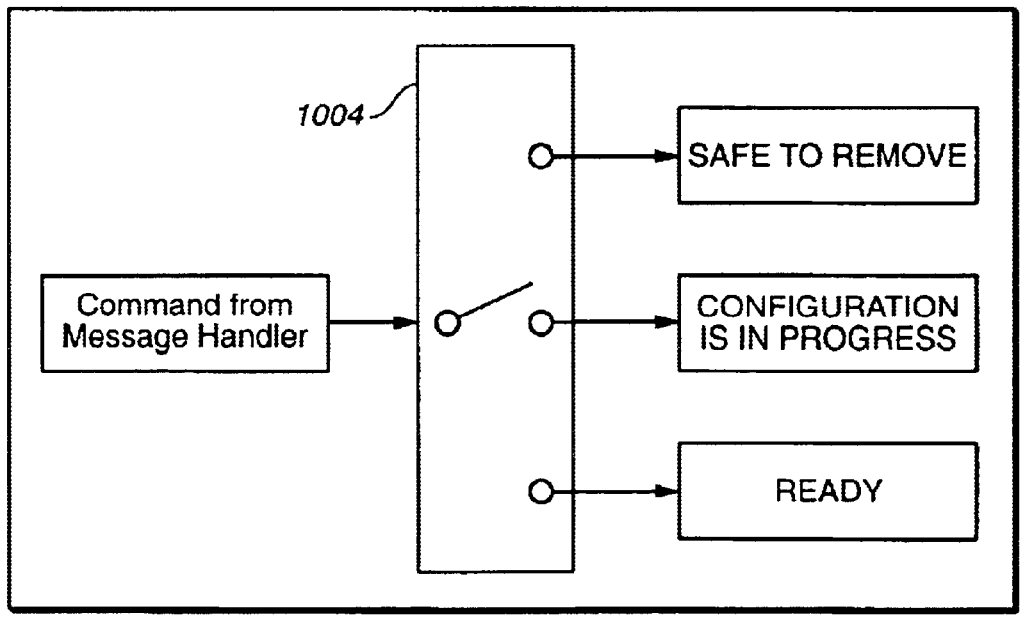
FIG._14

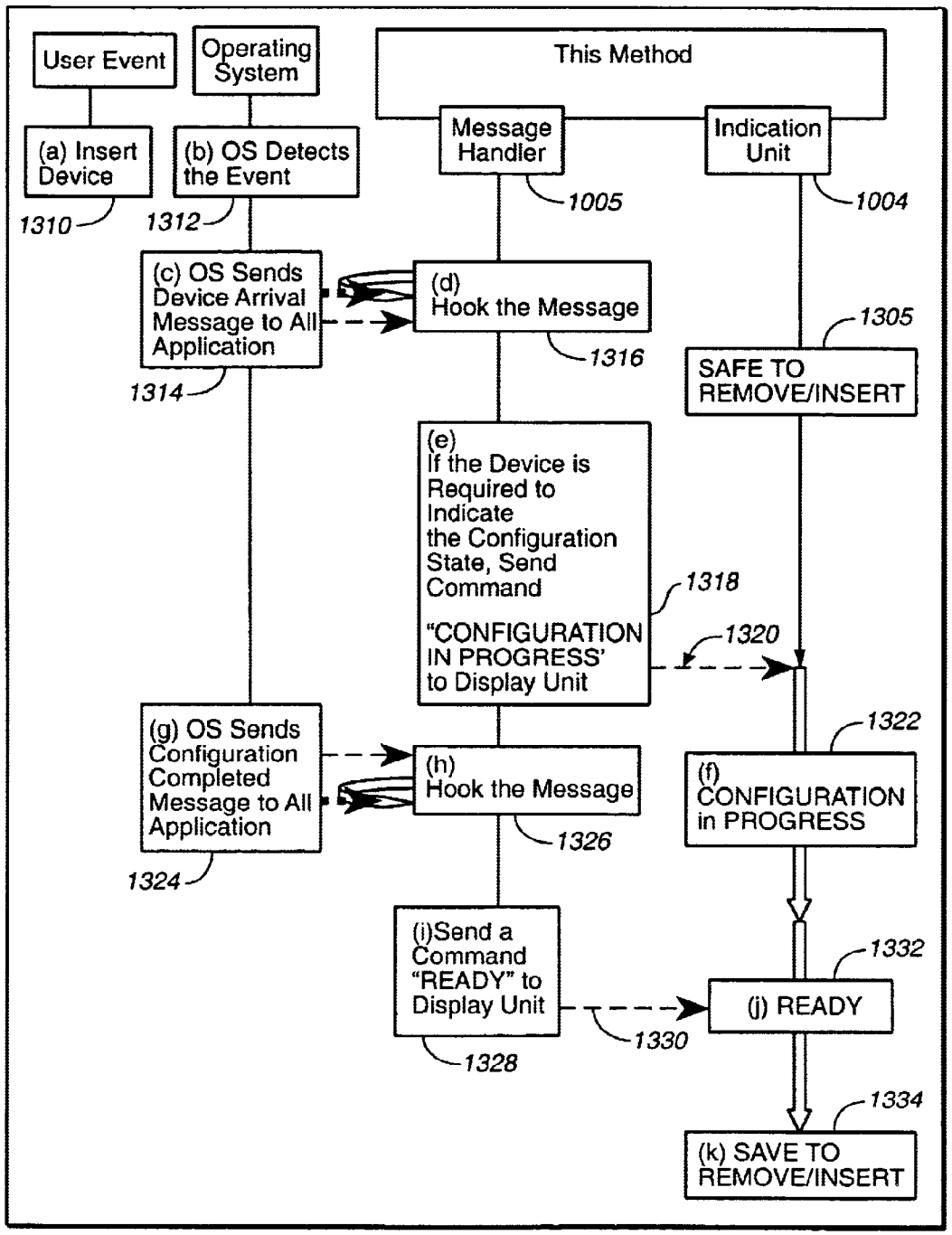
FIG._13

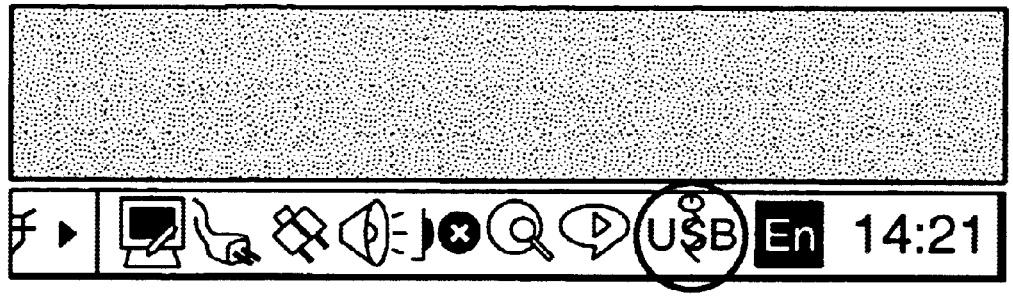
Circled in red is the icon and it means "SAFE TO REMOVE/INSERT"
FIG._15A
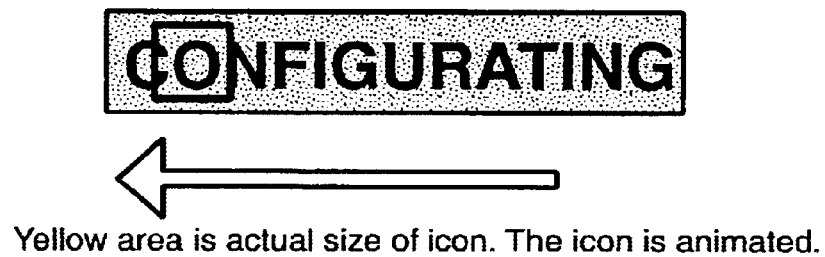
Yellow area is actual size of icon. The icon is animated.
FIG._15B
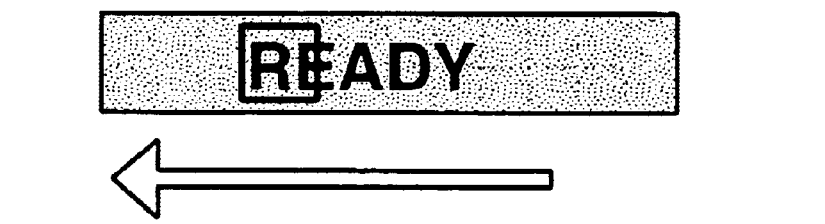
Yellow area is actual size of icon. The icon is animated.
FIG._15C

METHOD AND SYSTEM FOR RELIABLE DEVICE CONFIGURATION IN A COMPUTER SYSTEM

FIELD OF THE INVENTION

The present invention relates generally to providing notification of the status of a configuration process for a computer coupled to peripheral devices. More particularly, the present invention is directed towards providing notification of the status of a configuration process in a personal computer coupled to peripheral devices by universal serial bus (USB) connectors.

BACKGROUND OF THE INVENTION

Compact personal computers typically have a limited number of peripheral device ports. A problem that has developed is that there are a large variety of different device ports and different manufacturers developed proprietary interfaces for peripheral device ports which were incompatible with each other. One way that has been developed to increase the number of different peripheral devices that can be coupled to a personal computer is through a standard industry interface connector port.

There are several industry standard serial bus interfaces. One of the most commonly used in the universal serial bus interface (USB). USB is a standard interface for connecting peripheral devices to the system bus of a personal computer. USB is a fast, bi-directional, isochronous, low-cost, dynamically attachable serial interface. It is now commonly used for attaching personal computers to a wide variety of other peripheral input/output (I/O) devices, such as monitors, disk drives, modems, mice, printers, scanners, game controllers, keyboards, and other peripherals. With USB there is a single connector type, which permits all USB devices to plug into the same USB socket type. It is common for personal computers and notebook computers to include at least one USB port.

A USB operating system has software program subroutines which monitor the bus's topology and that control access to USB resources. A USB hub is responsible for transferring data upstream (to the computer) and downstream (from the computer to peripheral devices). A personal computer typically has a root hub, which commonly contains one or two USB ports. The root hub may be connected to other external hubs, thereby permitting a large number of peripheral devices to be coupled to a personal computer via an auxiliary hub, as shown in prior art FIGS. 1–2.

USB uses a token-based bus architecture. USB initialization software permits USB devices to be added or removed at any time via an enumeration process, i.e., USB connectors permit so-called "hot plugging" in which new devices can be coupled or uncoupled while the computer is in operation. Whenever a peripheral device is added or removed the change in topology is recognized by the personal computer and appropriate drivers are loaded so that the device is almost immediately available for use.

One goal of USB is true "plug and play" operation in which the user can dynamically couple peripheral devices to a personal computer for immediate use. Once a device is coupled to the PC host, the device is enumerated by the USB initialization software and assigned a unique identifier. However, in practice the configuration process can require a significant amount of time. The time required for the configuration process to be completed will depend upon many factors, such as the type of drivers that must be loaded and the complexity of the system, but will typically be at least several seconds. One problem caused by this is that the user may attempt to use the computer before the operating system has completed loading the drivers and applicable housekeeping activities. This may cause a system error. Another problem is that serious operating system (O/S) problems may result if a USB device is inserted and then removed before the bus topology is reconfigured. For example, if the plug and play device is inserted and then removed before successful reconfiguration, the O/S will not have completely finished processing the device configuration and its corresponding event. This may cause the USB bus to crash such that the other peripheral devices will not work properly. Similarly, a USB bus crash may occur if the user changes the type of device coupled to a USB socket before the bus topology has a chance to become reconfigured. For example, a user may first connect a printer to a USB socket and then change his or her mind and exchange the printer for a scanner. If the changeover occurs too rapidly the bus topology will not have sufficient time to complete the configuration process when the printer is connected or removed such that a USB bus crash may occur.

Known prior art systems do not directly notify a user of the status of the reconfiguration process. For example, the Windows® '98 operating system changes the mouse cursor to an hourglass icon whenever a USB device is plugged or unplugged. The hourglass icon disappears a short time after configuration is completed. However, one problem with using the hourglass icon is that it may be hard for the user to see it. For example, if the cursor is at the edge of the screen it may be hard to see the hourglass icon. There can also be a significant time delay before the hourglass icon is displayed by the system. Another problem is that the hourglass icon is generically used to indicate that the computer is busy and cannot be distinctly interpreted to mean that the USB device is being set up. Consequently, an hourglass icon may not provide a clear enough indication that the user should wait to couple/uncouple USB connectors. Most importantly, the hourglass icon does not directly inform the user exactly when it is safe for the user to couple or uncouple USB connectors. It is merely a general icon that indicates that the operating system is busy and does not display the status of the configuration process.

What is desired is a new apparatus and method for providing real time notification of the progress of a configuration process for a computer coupled to other devices or systems by a serial bus, such as a personal computer coupled to peripheral devices by a USB interface.

SUMMARY OF THE INVENTION

A goal of the present invention is to improve the reliability of a configuration process for a computer coupled to a peripheral device via a serial bus interface. Broadly speaking, the present invention is directed towards providing real-time information to a user which will assist the user to avoid coupling or decoupling peripheral devices to the computer at inappropriate times.

The apparatus of the present invention generally comprises a computer system including: a computer having at least one serial bus port for coupling peripheral devices to the computer; an operating system residing on the computer programmed to dynamically configure the computer system, the operating system having a first subroutine for generating a first internal message indicative of the operating system sensing a change in the number of devices coupled to said computer and a second subroutine for generating a second message indicative of said operating system completing a configuration process; and a configuration notification program residing on the computer receiving the first and the second messages and creating a visual display notifying the user in real time when it is unsafe to remove or insert a plug and play device. In a preferred embodiment, the configuration notification program comprises a message handler residing on the computer, the message handler hooking the first and the second messages, the message handler including a message analyzer unit and a state determination unit arranged to provide a first output signal when the configuration process is in progress and a second output signal when the configuration process is completed; and an indication unit residing on the computer and coupled to the output of the message handler, the indication unit generating a visual display notifying the user when it is unsafe to remove or insert a plug and play device.

The method of the present invention for providing notification of the status of a reconfiguration process of an operating system of a computer coupled to peripheral devices generally includes the steps of: detecting an event message generated by the operating system whenever the number of the peripheral devices coupled to the computer changes; determining if the detection message corresponds to a change in the number or type of the peripheral devices requiring that a user be notified; notifying the user that a configuration process is in progress; detecting a completion message generated by the operating system when the configuration process is completed; determining if the completion message corresponds to a change in the number or type of the peripheral devices requiring that the user be notified that the configuration process is completed; notifying the user that the configuration process is complete; and notifying the user that it is safe to change the number or type of peripheral devices coupled to the computer.

One object of the present invention is a method and apparatus to reduce the frequency of universal serial bus crashes. In a preferred embodiment of a compact personal computer, a compound hub performing a port replication function is used to reduce the number of connectors attached to the case of the computer. The configuration notification unit generates a warning to the user when configuration is in process such that it is unsafe to couple or decouple a peripheral device to the computer, thereby reducing the frequency with which users couple or decouple peripheral devices at inappropriate times.

Another object of the present invention is a method and apparatus for providing prompt notification to the user when configuration is complete, thereby assisting the user to determine when the computer system is ready for further action.

Still another object of the present invention is method and apparatus to notify users when it is safe to couple or decouple peripheral devices to a computer.

BRIEF DESCRIPTION OF THE DRAWINGS

FIG. 1 depicts a prior art computer system in which the computer is coupled to a peripheral device by a universal serial bus hub.

FIG. 2 depicts a prior art computer system in which a computer is coupled to a peripheral device via nested universal serial bus hubs.

FIG. 3 is a block diagram of a prior art hub.

FIG. 4 is a block diagram of a prior art compound hub.

FIG. 5A is perspective of a preferred compound hub having a plurality of connector ports.

FIG. 5B is a block diagram of the electronic function of the hub shown in FIG. 5A.

FIG. 6A is an illustrative side view of a compact portable computer.

FIG. 6B is a perspective view of the computer of FIG. 6A.

FIG. 7 is a rear view of the case of a conventional portable computer, showing the relative area of common connector ports.

FIG. 8 is a rear view of the case of a conventional compact portable computer coupled to a conventional port replicator, showing the relative area of common connector ports.

FIG. 9 shows a rear view of a preferred compact computer coupled to a compound port similar to that shown in FIG. 5A.

FIG. 10 shows a preferred embodiment of the configuration notification system of the present invention.

FIG. 11A is a schematic block diagram illustrating how conventional operating systems dispatch event messages to application programs.

FIG. 11B is a functional block diagram showing the flow of internal messages in a conventional operating system.

FIG. 12 is a functional block diagram of the configuration notification unit of the present invention.

FIG. 13 is a flow chart showing a preferred method of operation of the configuration notification unit of FIG. 12.

FIG. 14 is a block diagram showing the display outputs of the identification unit of FIG. 12.

FIG. 15 shows preferred display screen implementations of the outputs of FIG. 14.

DETAILED DESCRIPTION OF THE INVENTION

As shown in FIG. 1, a serial bus interface may be used to connect peripheral device 40 to a computer 10. A commonly used serial bus interface is the universal serial bus interface (USB). While a single peripheral device could be coupled via a USB connector, it is common to couple several devices to a computer via a hub. As shown in FIG. 1, USB cables 80 may couple one or more peripheral devices to computer 10 via a hub 30. As shown in FIG. 2, several hubs can be coupled together to further increase the potential number of peripheral devices coupled to a computer. As indicated in FIG. 2, with USB, peripheral devices can be nested up to five hub (30A–E) levels deep such that up to 127 I/O devices may be connected to one personal computer using the USB interface.

FIG. 3 is a block diagram of a conventional hub 330. Hub 330 includes an upstream connector 335 for communicating with computer 10. A repeater 340, controller 345, and power control 350 are arranged to control the flow of data between upstream connector 335 and downstream connectors 355. FIG. 4 is a block diagram of a compound hub 430. Compound hub 430 includes an upstream connector 435, and a repeater 440, controller 445, and power control 450. However, in addition to downstream connectors 455, it has embedded I/O devices 460. These embedded I/O devices may comprise any conventional I/O device communicating with computer 10 via a USB interface, i.e., the I/O devices are integrated into the hub and provided with control circuits that permit them to communicate to the computer via the USB interface. Repeater 440, controller 455, and power control 450 are arranged to control the flow of data between upstream connector 435, downstream connectors 455 and embedded devices 460.

FIG. 5A is a profile view of a compound hub 530 manufactured by Fujitsu, Ltd. of Japan, the assignee of the present invention, and sold as the Fujitsu Universal LAN Hub®. Compound hub 530 includes an upstream USB port 510, several downstream USB ports 515, 520, and 525, several peripheral device connectors, such as a "parallel" connector port 540, a PS/2 keyboard port connector 550, an RJ-45 Ethernet connector port 560, an RS232-type communications connector port 570, a PS/2 mouse connector port 580, along with a volume control 585, and a headphone jack 590. FIG. 5B is a functional block diagram of compound hub 530. As can be seen in FIG. 5B, each of the connector ports functions as an embedded USB I/O device, i.e., communicates to an upstream computer via the USB upstream port.

Compound hub 530 provides an important benefit for portable computers with a limited number of connector ports. As used in this application, a portable computer includes, but is not limited to, laptop computers, notebook computers, and other types of compact portable computing devices. FIG. 6A is side view of compact notebook computer 600, while FIG. 6B is a profile view of the compact notebook computer 600. As shown in FIGS. 6A and 6B, computer 600 has a case 610. Within case 610 resides a compact electronic computer CPU 620. A display 640 is coupled to computer 600 in a conventional folding clamshell arrangement. Computer 600 typically has at least one universal serial bus connector (not shown in FIGS. 6A and 6B) disposed along a rear 630 or side surface 632 of case 610. One limitation to the size of computer 600 is the physical size and weight of the connectors required to couple the computer to peripheral devices. Generally speaking, it is desirable to be able to couple a computer to many different types of peripheral devices, such as printers, scanners, mice, disk drives, etc. However, while the size of personal computers continues to shrink, the physical size of the connectors required to form a signal link to peripheral devices has not decreased.

FIG. 7 is a view of the rear surface of a computer case of a conventional all-in-one portable computer 700. Computer 700 is an all-in-one computer in the sense that it has all of the commonly desired connector ports. These include a keyboard port 715, a mouse port 710, an audio port 720, a modem port 725, an infrared (IrDA) port 730, a monitor port 735, two USB ports 740, a parallel port 745, a serial port 750, a proprietary external expander connector 755, and a LAN port 760. The relative area of various connector ports is shown in FIG. 7. As can be seen in FIG. 7, a considerable amount of area is required for these connector ports. Additionally, the connector ports and associated internal mechanical and electrical components significantly increase the total volume and weight of computer 700.

External port replicators are one way to increase the number of effective ports coupled to a computer. FIG. 8 shows a conventional compact portable computer 800 coupled to a conventional proprietary I/O expander 880. As can be seen in FIG. 8, some of the peripheral device connector ports, such as keyboard port 815, mouse port 810, serial bus port 855 and parallel port 845 now reside in expander unit 880, which replicates the function of some or all of the ports of an all-in-one portable computer. However, in this conventional arrangement space is still required for proprietary external expander connector port 860, which is required to couple to a corresponding female expander connector 870 on expander 880.

FIG. 9 shows the rear surface 902 of an embodiment of a compact computer 900 of the present invention developed by the inventors for use with the compound hub 530 shown in FIG. 5. A single USB port 905 is used to couple signals to external hub 530. Most of the large area peripheral device connector ports of a conventional all-in-one computer are now disposed on hub 530 and are connected to the computer 900 via the USB port 905. Additionally, external expander connector port 755 is eliminated in computer system 900. Comparing FIGS. 7, 8, and 9, it can be seen that computer 900 requires a reduced area of rear surface 902 to be devoted to connectors. Moreover the associated internal volume and weight of the connectors disposed in computer 900 is also reduced, permitting a reduction in the total volume and weight of computer 900. Consequently, computer 900 can be reduced in size and perform an all-in-one function. Note also that the total number of ports, particularly USB ports, is increased compared to computer 700. Consequently, the inventive computer system 900 of FIG. 9 reduces the size and weight of computer 900 while permitting a greater number of peripheral devices to be coupled to computer 900. The computer system 900 shown in FIG. 9 is particularly useful for compact notebook computers in which it is desirable to reduce the height, h, and width, w, of a computer 900, as indicated in FIG. 9. However, computer system 900 could also be generalized to other compact electronic computer systems in which a electronic computer unit is coupled via a serial bus connector 905 to a compound hub 530.

Referring to FIG. 9, it can be seen that in a preferred embodiment of system 900 that there are three USB downstream ports and six peripheral device ports disposed on compound hub 530. The six peripheral device ports function as embedded USB devices. Consequently, all of the nine ports function as hot-pluggable USB ports, i.e., computer 900 monitors the status of all nine ports and dynamically reconfigures computer system 900 whenever a device is coupled or uncoupled from one of the ports. Consequently, the frequency of hot-plugging of computer system 900 will tend to be significantly greater than for a conventional portable computer 700. This increases the risk of a system error if a user does not wait while the system is being reconfigured each time a device is plugged or unplugged.

In developing computer system 900 the inventors discovered that the frequency of USB bus crashes increased compared to a conventional computer 700. The inventors believe that one explanation for this is that a more complex bus topology is created. The inventors believe that another explanation is that conventional O/S software and drivers may not be as robust to reconfiguration errors as generally believed. Still another explanation is that the increased number of effective USB ports of computer system 900 tends to increase the frequency of hot plugging, thereby increasing the likelihood that a user will not wait a sufficiently long period of time for system 900 to configure itself before unplugging one USB device and inserting another USB device.

Conventional operating systems do not provide a direct notification to the user of what is happening in the internal operating system during the reconfiguration process. Consequently, the user does not know exactly when the operating system has completed the configuration process. To reduce the frequency of USB bus crashes, the inventors developed an apparatus and method to provide direct notification to the user of the status of the configuration process in system 900.

FIG. 10 shows a block diagram of the inventive notification system 1000. A computer unit 1010 has an operating system 1020 residing on it. Computer 1010 has a display 1040 and a downstream USB connector 1050 coupled to the case 1060. Computer 1010 preferably also has a speaker 1035 for providing an audio output. Computer 1010 may be any type of computer but is preferably a compact personal computer, such as a notebook computer. A standard USB cable 1055 couples USB connector 1050 to other devices, preferably via a hub 1070. Hub 1070 may be any type of USB hub, but is preferably a compound USB hub. Hub 1070 preferably has at least one embedded device 1075 or at least one embedded connector 1080 in order to increase its functionality. Hub 1070 also preferably includes at least one downstream USB port 1090.

As shown in FIG. 10, a software program which is a configuration notification unit 1030 resides on computer 1010. As described below in more detail, configuration notification unit 1030 provides notification to the user, preferably via display 1040 and speaker 1035, of when the configuration process is complete such that it is safe to couple/uncouple devices to computer 1010 via hub 1070.

The function and operation of configuration notification unit 1030 is illustrated in FIGS. 11–15. FIG. 11A is a block diagram of a conventional operating system 1100. The operating system detects incoming events requiring action and transmits internal messages about these events to coordinate the activities of system resources. The operating system includes subroutines for generating internal messages alerting other components that an event has been detected and that the configuration process is completed. As one example, an incoming event may be a keyboard input. For peripheral devices coupled by serial bus connectors to a computer, the operating system senses changes in the bus topology whenever a device is coupled or uncoupled from the computer. As shown in FIG. 11A, an operating system includes subroutines which converts an incoming event 1110 into a corresponding message 1120 before dispatching it via a dispatcher 1130 to other applications or components, such as the application software 1140 and device drivers 1160. Referring to FIG. 11B, in the conventional graphical user interface (GUI) operating system of the Windows® O/S, operations such as mouse clicking, keyboard typing and powering the system on/off, causes the operating system to generate message(s) using the information from the device driver. The messages which are thus generated are then sent to all application software running on the operating system. All running application software thus receives the message (s) notifying them about a hardware status change. Each application then processes the message if the message is applicable or otherwise related to the application. FIG. 11B shows some of the messages related specifically to the Windows® O/S. The O/S software used to generate these internal messages are well known in the art.

Referring again to FIG. 11A, for peripheral devices, each message contains information about the detected device. If one of the components, such as the application software or device drivers, has the capability to handle the event, then the component can capture the event and process it. Note that in a conventional operating system that the messages 1120 dispatched by dispatcher 1130 are used solely for coordinating the internal resources of the computer. The computer user has no direct knowledge of the internal messages being transmitted by dispatcher 1130 to an application 1140.

The inventors have recognized that these internal messages 1120 generated by the operating system can be used by the configuration notification unit 1030 to generate an output to the user which indicates precisely when the system has reconfigured itself, i.e., to provide direct notification of precisely when it is safe to couple or uncouple a serial bus connector to the computer.

FIG. 12 is a block diagram of configuration notification unit 1030. The function of configuration notification unit 1030 is to provide an output which notifies a user in real-time of the status of the configuration process. In a preferred embodiment, configuration notification unit 1030 includes a message handler 1005 coupled to an indication unit 1004. Message handler 1005 includes as sub-units a message analyzer unit 1002, and a state determination unit 1003. Message analyzer unit 1002 analyzes the information of a message to determine if the event is related to device plug-in or plug-out. If an event is related to device plug-in or plug-out, state determination unit 1003 determines the configuration state (e.g., configuration process initiated, configuration in process, or configuration completed). The indication unit 1004 preferably performs the function of a display unit, i.e., generates a visual display which provides the user with a display to inform the user of the status of the configuration process and, particularly, whether it is safe to remove or insert a plug and play device. However, more generally indication unit 1004 may generate any type of output that notifies the user of the configuration status, such as an audio output.

The message handler 1005 accepts messages related to incoming events. For a Windows®operating system, message handler 1005 preferably accepts messages via a Windows® message hook mechanism and DLL functionality. The term "hook" is a common term of art. However, the hooking function is also sometimes alternately described by the terms monitor, intercept, or event processor. While the Windows®operating system is one common operating system with a message hook mechanism, it will be understood that many modem multi-tasking operating systems have a similar internal functionality to handle messages and inter-process communications. Consequently, the apparatus and method of the present invention is not limited to the Windows® operating system but may also be implemented on other operating systems. Moreover, message handler 1005 may be implemented in other operating systems using a powerful high level programming language like C, Pascal, or even a platform specific language.

Message handler 1005 queries hooked messages for additional information to determine if a device node has changed and determines if the device is a USB device. If the device is a USB device, the message handler sends a signal to indication unit 1004 that instructs indication unit 1004 to create an appropriate output to notify the user when it is safe to remove or insert a new device.

FIG. 13 is a flow chart showing a preferred method of operation of configuration notification unit 1030. Note that in a preferred embodiment that indication unit 1004 provides an output 1305 indicating that it is safe to remove or insert a device when the system is in a steady-state configuration. Thus output 1305 corresponds to a preferred embodiment in which the user, prior to inserting or removing a device, is alerted that it is safe to remove or insert a new plug and play device, i.e., the computer system is in a stable, configured state. Output 1305 is preferably automatically generated by configuration notification unit 1030 a preset time period after the system has configured itself.

As indicated in block 1310, a user event is generated whenever the user couples or uncouples a peripheral device to the computer. As indicated in block 1312, the operating system automatically detects such events. After an event is detected, the operating system automatically sends an internal detection message to all applications (i.e., all active operating system processes, components, and software applications, in accordance with conventional operating system operation), as shown in block 1314. This message typically includes information on the device type and node location. Message handler 1005 hooks event messages, as shown in block 1316. As shown in block 1318, message analyzer unit 1002 determines if the message corresponds to a plug and play device. If the message is from a USB plug and play device then state determine unit 1003 selects an appropriate configuration state message which indication unit 1004 should display (e.g., "configuration in progress"), as shown at block 1318.

As indicated by dashed arrow 1320, for messages corresponding to a USB plug and play device for which it is necessary to notify the user of the configuration status, message handler 1005 provides an appropriate signal to indication unit 1004, whereby indication unit 1004 generates an output indicative that configuration is in progress, as indicated by block 1322. Note that the user is thus promptly warned that the reconfiguration process is in progress. The output 1322 is preferably provided within a short period of time (i.e., a small fraction of a second, depending upon the speed of the computer) so that the user can minimize the time required to wait for the configuration process to be completed. A preferred method is to display a visual indicator on the display 1040 of computer 1010. In addition, an audio signal may be output via speaker 1035.

A conventional operating system automatically dispatches an internal message when the configuration process is completed, as indicated in block 1324. Message handler 1005 hooks this completion message, as indicated at 1326, determines that it is from a plug and play device via message analyzer unit 1002, and that configuration is complete using state determination unit 1003. As indicated in block 1328, message handler 1005 then sends a command 1330 to indication unit 1004 to alert the user that configuration is complete, i.e., that the system is ready, as indicated by block 1332. As indicated by dashed arrow 1330 this step is also preferably performed rapidly (i.e., in a small fraction of a second) so that the user promptly receives notification that the system is ready almost immediately after the operating system sends its configuration complete message to internal applications. In a preferred embodiment, as shown by block 1334, the indication unit 1004 will then display a message indicating that it is safe to remove or insert new devices.

FIG. 14 is a block diagram showing the outputs of a preferred embodiment of indication unit 1004. As indicated in FIG. 14, in a preferred embodiment, indication unit 1004 generates three outputs: a ready display, a configuration in progress display, and a safe to remove display. A preferred screen display implementation is shown in FIG. 15. FIG. 15(a) shows a preferred screen display implementation of a USB icon 1502, which indicates that it is safe to remove or insert a USB device. FIG. 15(b) shows a preferred screen display implementation of an animated icon 1504 displaying a message that configuration is in progress. FIG. 15(c) shows a preferred screen display implementation of an animated icon 1506 indicating that the system is ready. Each of the icons in 15(a), 15(b), and 15(c) preferably has a different color code, and is positioned on the screen "tray."

Although the present invention has been discussed in detail in regards to a compact personal computer with a USB interface, it will, be understood that the inventive configuration status notification apparatus and method may be beneficially used on a variety of other electronic computers, such as conventional portable computer 600 or 700. Additionally, it will be understood that the present invention may be practiced with a variety of serial bus interfaces. While the USB interface is one industry standard serial bus interface, the method and apparatus of the present invention may be applied to any serial bus interface in which the operating system senses changes in system topology and performs an enumeration process to load appropriate drivers as part of a reconfiguration process. As one example, the IEEE 1394 serial bus is another serial bus for which the method and apparatus of the present invention may be applied.

It will also be understood that a variety of compact electronic devices aside from portable computers are the electronic equivalent of a portable personal computer. There is a general push in the electronics art for hot-pluggable serial signal bus connectors to be made to a variety of compact electronic devices. Consequently, it is believed that the method and apparatus of the present invention are applicable to a variety of analogous electronic systems.

Although a preferred embodiment of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims.

What is claimed is:

1. A plug and play computer system, comprising:
    a) a computer having a visual display and at least one exterior serial bus port for coupling at least one peripheral device to said computer;
    b) an operating system residing on said computer programmed to dynamically configure the computer system, said operating system having a subroutine for generating a first internal configuration message indicative of said operating system sensing a change in the number of devices coupled to said computer and a subroutine for generating a second internal configuration message indicative of said operating system completing a configuration process; and
    c) a configuration notification program residing on said computer for receiving said first and said second internal configuration messages and creating a visual display for notifying the user in real time when it is unsafe to couple or uncouple a plug and play device to said computer.

2. The system of claim 1, wherein said configuration notification program comprises:
    a message handler residing on said computer, said message handler hooking said first and said second configuration messages, said message handler including a message analyzer unit and a state determination unit arranged to provide a first output signal when the configuration process is in progress and a second output signal when the configuration process is completed; and
    an indication unit residing on said computer and coupled to the output of said message handler, said indication unit generating a visual display notifying the user when it is unsafe to couple or uncouple a plug and play device to said computer.

3. The system of claim 2, wherein said indication unit generates a first display indicating that it is safe to remove or insert a device, a second display corresponding to notification that the configuration process is in progress, and a third display corresponding to notification that the configuration process is complete.

4. The system of claim 2, wherein said system utilizes a universal serial bus interface and wherein said serial bus port is a universal serial bus port.

5. The system of claim 4, further comprising a compound hub and wherein said compound hub is coupled to said port via a universal serial bus cable.

6. The system of claim 2, wherein said computer includes a audio output port and said indication unit generates an audio signal to said audio output port indicative of the status of the configuration process.

7. A computer system, comprising:
   a) a computer having at least one USB port;
   b) a compound hub having an USB connector coupled to said USB port of said computer via a USB cable, said hub having at least one USB connector port and at least one non-USB peripheral device port;
   c) an operating system with USB interface capability residing on said computer, said operating system generating a subroutine for generating a first internal configuration message indicative of said operating system sensing a change in the bus topology and a subroutine for generating a second internal configuration message indicative of said operating system completing a configuration process for said bus topology;
   d) a message handler residing on said computer for hooking said first and second internal configuration messages, said message handler including a message analyzer unit and a state determination unit arranged to provide a first output signal when the configuration process is in progress and a second output signal when the configuration process is completed; and
   e) an indication unit residing on said computer and responsive to the output of said message handler, said indication unit generating a visual display in real time notifying the user whether it is unsafe to remove or insert a plug and play device.

8. The system of claim 7, wherein said indication unit generates a first display indicating that it is safe to remove or insert a device, a second display indicating that a configuration is in progress, and a third display indicating that the configuration process is complete.

9. The system of claim 8, wherein said compound hub has a plurality of non-USB peripheral device ports.

10. The system of claim 9, wherein said compound hub replicates the function of a mouse port, a serial port, a printer port, and a keyboard port.

11. A method of providing notification of the status of a configuration process of an operating system of a computer having at least one USB port enabling the computer to be coupled to peripheral devices, comprising the steps of:
   (a) detecting an internal configuration message generated by the operating system (whenever the number of the peripheral devices coupled to the computer via the USB port changes;
   (b) determining if said internal configuration message corresponds to a change in the number or type of said peripheral devices requiring that a user be notified;
   (c) notifying the user in real time that a configuration process is in progress when it is determined that the change requires that the user be notified;
   (d) detecting an internal configuration completion message generated by the operating system when a peripheral device configuration process is completed;
   (e) determining if said internal configuration completion message corresponds to a change in the number or type of said peripheral devices requiring that the user be notified that the configuration process is completed;
   (f) notifying the user in real time that the configuration process is complete when it is determined that said internal configuration completion message requires that the user be notified; and
   (g) notifying the user that it is safe to change the number or type of peripheral devices coupled to the computer.

12. A method of notifying a computer user of the status of a reconfiguration process initiated by coupling or uncoupling a peripheral device to a computer via a universal serial bus connector (USB), comprising the steps of:
   (a) providing an operating system that automatically detects whenever the number or type of peripheral devices coupled to the computer via said USB connector changes, said operating system generating an internal configuration detection message whenever the number or type of peripheral devices coupled to the computer via said USB connector changes such that a device configuration process is initiated and a configuration completion message when the device configuration process is completed;
   (b) hooking said internal configuration detection message;
   (c) notifying the user in real time that a device configuration process is in progress;
   (d) hooking said internal configuration completion message;
   (e) notifying the user that the device configuration process is complete and that it is safe to change the number or type of peripheral devices coupled to the computer via said USB connector.

13. A method of avoiding crashes in a computer system comprising the step of:
   providing a USB configuration notification unit having a message handler and an indication unit, said configuration notification unit monitoring internal configuration messages generated by an operating system related to a configuration process, said configuration notification unit providing a computer display output indicating when a configuration process is in progress for a USB device;
   wherein said computer display output is updated in real time so that a user is provided information in real time concerning whether it is safe to plug or unplug a USB device to the computer system.

14. The method of claim 13 wherein said computer system comprises a graphical user interface including a representation of a system tray, and said computer display comprises an icon which is resident in said system tray.

15. The method of claim 13 wherein said computer display output comprises at least two unique indicators, one of said indicators for alerting the user that a device connected to the computer via a USB port is being configured and another of said indicators for alerting the user that it is safe to plug or unplug a device to said computer via said USB port.

16. The method of claim 15 wherein said computer display output comprises a third indicator for advising the user that device configuration has been completed.

17. The method of claim 14 wherein the color of said icon is changed by said configuration notification unit depending on the state of said USB port and the configuration state of the devices coupled or uncoupled to said USB port.

18. The method of claim 14 wherein textual information is provided within said icon depending on the state of said USB port and the configuration state of the devices coupled or uncoupled to said USB port.

19. The system of claim 2 wherein said operating system provides a graphical user interface having a system tray, and wherein said indication unit comprises an icon which is resident in said system tray.

20. The system of claim 19 wherein said icon displays a first color when it is safe to couple or uncouple a plug and play device to said computer system and displays a second color when it is unsafe to couple or uncouple a plug and play device to said computer system.

21. The system of claim 3 wherein each of said first, second and third displays are located in a system tray of a graphical user interface.

22. The system of claim 6 wherein said audio output port is coupled to a speaker.

23. The computer system of claim 7 wherein said visual displays are located in a system tray of a graphical user interface.

24. The computer system of claim 8 wherein said visual displays are color coded.

25. A configuration notification program for enhancing the operation of a computer system having at least one USB port and an operating system having a graphical user interface, said operating system having the capability of monitoring said USB port, generating an internal message when a device is coupled to the computer via said USB port, configuring a device coupled to the computer via said USB port, and generating an internal message indicating that configuration of the device has been completed, said program comprising:

a message handler for hooking said internal messages, a indication unit for generating and displaying in real time information indicating whether a device coupled to said computer via said USB port has been configured, such that a user of the computer is alerted whenever there is an enhanced risk that coupling or uncoupling a device to said computer via said USB port will cause a system crash because a configuration process is underway.

26. The notification program of claim 25 wherein said indication unit generates a unique display indicating that it is safe to couple or uncouple a device to said computer via said USB port.

27. The notification program of claim 25 wherein said graphical user interface comprises a system tray and wherein said indication unit displays an icon in said system tray indicating in real time whether a device coupled to said computer via said USB port is being configured.

* * * * *